US012057647B2

(12) United States Patent
Liao et al.

(10) Patent No.: US 12,057,647 B2
(45) Date of Patent: Aug. 6, 2024

(54) ANTENNA MODULE

(71) Applicant: Merry Electronics Co., Ltd., Taichung (TW)

(72) Inventors: Wei Sheng Liao, Taichung (TW); Tien-Fu Hung, Taichung (TW); Ming-Hung Tsai, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 179 days.

(21) Appl. No.: 17/881,631

(22) Filed: Aug. 5, 2022

(65) Prior Publication Data

US 2024/0014565 A1 Jan. 11, 2024

(30) Foreign Application Priority Data

Jul. 8, 2022 (TW) .................................. 111125645

(51) Int. Cl.
*H01Q 1/27* (2006.01)
*H01Q 1/38* (2006.01)
*H01Q 1/48* (2006.01)
*H01Q 9/42* (2006.01)

(52) U.S. Cl.
CPC ................. *H01Q 9/42* (2013.01); *H01Q 1/38* (2013.01); *H01Q 1/48* (2013.01); *H01Q 1/273* (2013.01)

(58) Field of Classification Search
CPC ............ H01Q 1/243; H01Q 9/42; H01Q 1/38; H01Q 1/48; H01Q 1/2291; H01Q 1/273; H05K 1/00; H05K 7/02; H05K 7/06; H05K 7/08; H05K 7/10; H05K 1/18; H05K 1/11; H05K 1/14
See application file for complete search history.

(56) References Cited

U.S. PATENT DOCUMENTS 7,589,975 B2 * 9/2009 Ootani .................... H05K 1/028 439/165
2004/0027298 A1 * 2/2004 Iguchi .................. H01Q 9/0414 343/702
2006/0067070 A1 * 3/2006 Otsuki ................. H05K 9/0022 257/E21.705
2008/0001830 A1 * 1/2008 Hirai ................... H04M 1/0214 343/702
2009/0058740 A1 * 3/2009 Cho ......................... H01Q 1/38 343/702
2012/0181068 A1 * 7/2012 Kato ........................ H05K 3/44 156/60

(Continued)

*Primary Examiner* — David E Lotter
(74) *Attorney, Agent, or Firm* — JCIPRNET

(57) ABSTRACT

An antenna module includes a first board, a connecting board, a second board, an antenna radiator, and a circuit reference ground. The first board at least includes a first end. The connecting board has a first and a second connection end. The second board includes a second end and a bottom end. The second board and the connecting board are made of different materials.

The antenna radiator extends along the extending direction of the connecting board and the second board, and defines a first and a second radiation end. The circuit reference ground extends along the extending direction of the first board, the connecting board, and the second board, and defines a first reference end formed on the first board and a second reference formed on the second board. The circuit reference ground and the antenna radiator are spaced apart and form an interval.

10 Claims, 2 Drawing Sheets

(56) References Cited

U.S. PATENT DOCUMENTS

| | | | | |
|---|---|---|---|---|
| 2013/0038501 | A1* | 2/2013 | Kato | H01Q 9/0407 343/860 |
| 2014/0376199 | A1* | 12/2014 | Kato | H05K 1/0298 361/753 |
| 2015/0087353 | A1* | 3/2015 | Yosui | H01B 17/56 156/308.2 |

* cited by examiner

ANTENNA MODULE

CROSS-REFERENCE TO RELATED APPLICATION

This application claims the priority benefit of Taiwan application serial no. 111125645, filed on Jul. 8, 2022. The entirety of the above-mentioned patent application is hereby incorporated by reference herein and made a part of this specification.

BACKGROUND

Technology Field

The disclosure relates to an antenna module, and particularly, to an antenna module distributed on multiple boards.

Description of Related Art

With the consumers' demand for light and convenient earphones and an increasing maturity in earphone production technology, true wireless earphones that connect electronic devices wirelessly have gradually become mainstream products in the earphone market. Generally, a true wireless earphone requires various electronic components such as circuit boards, batteries, antennas, microphones, and speakers, which take up a lot of internal space of the earphone. Therefore, how to configure an antenna in the limited internal space of the earphone without affecting the performance of the antenna to meet consumers' demand for light and convenient earphones is the focus of research in the field.

SUMMARY

The disclosure provides an antenna module with favorable space utilization efficiency and antenna performance.

The antenna module of the disclosure includes a first board, a connecting board, a second board, an antenna radiator, and a circuit reference ground. The first board at least includes a first end. The connecting board has a first connection end and a second connection end opposite to the first connection end. The first connection end is connected to the first end of the first board. The second board includes a second end and a bottom end opposite to the second end. The second end is connected to the second connection end of the connecting board, and the second board and the connecting board are made of different materials. The antenna radiator extends along an extending direction of the connecting board and the second board and defines a first radiation end and a second radiation end opposite to the first radiation end. The first radiation end is formed on the first connection end of the connecting board and electrically connected to the first board, and the second radiation end is formed on the second board. The circuit reference ground extends along an extending direction of the first board, the connecting board, and the second board to define a first reference end and a second reference end opposite to the first reference end. The first reference end is formed on the first board, and the second reference end is formed on the second board. The circuit reference ground and the antenna radiator are spaced apart and form an interval between the circuit reference ground and the antenna radiator.

In an embodiment of the disclosure, the antenna radiator includes a first portion and a second portion connected to each other, the first portion is disposed on the second board, the second portion is disposed on the connecting board, the first portion has a patterned structure, the first radiation end is formed on the second portion, and the second radiation end is formed on the first portion and extends to the bottom end of the second board.

In an embodiment of the disclosure, a distance of the interval between the second portion of the antenna radiator and the circuit reference ground is greater than or equal to 0.4 mm.

In an embodiment of the disclosure, the patterned structure is meandering and includes multiple bends.

In an embodiment of the disclosure, the second portion is arc-shaped or straight.

In an embodiment of the disclosure, the connecting board is made of flexible materials.

In an embodiment of the disclosure, a width of the first portion is greater than a width of the second portion.

In an embodiment of the disclosure, the antenna module further includes an antenna chip assembly disposed on the first board, and the antenna radiator is electrically connected to the antenna chip assembly.

In an embodiment of the disclosure, on the connecting board, the circuit reference ground and the antenna radiator have a thickness greater than 0.33 oz.

In an embodiment of the disclosure, a frequency band coupled out by the antenna radiator ranges from 2.4 GHz to 2.5 GHz.

In summary, in the antenna module of the disclosure, the antenna radiator extends along the extending direction of the connecting board and the second board, and the circuit reference ground extends along the extending direction of the first board, the connecting board, and the second board. The distribution range of the antenna radiator and the circuit reference ground is not limited to a single board.

Accordingly, more space on the first board and the second board is freed up since the distribution range of the antenna radiator and the circuit reference ground can cover the connecting board for connecting the first board and the second board, so as to effectively improve the space utilization efficiency of the antenna module. In addition, the distance between the circuit reference ground and the antenna radiator can reduce the coupling effect between the two, thereby implementing higher gain variation and antenna performance of the antenna module.

DESCRIPTION OF THE EMBODIMENTS

Figure 1:
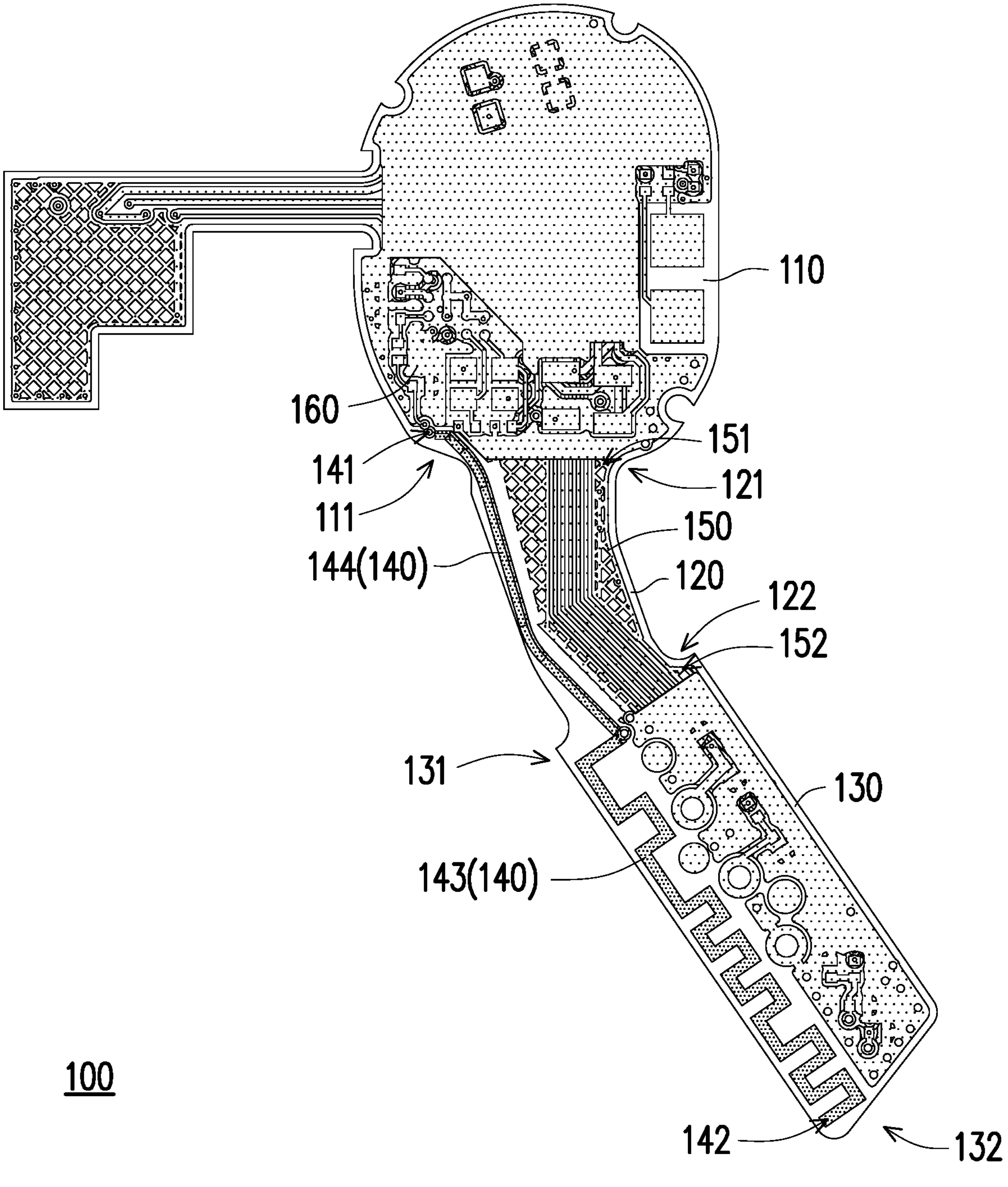
FIG. 1 is a top view of an antenna module according to an embodiment of the disclosure.

FIG. 1 is a top view of an antenna module according to an embodiment of the disclosure. Referring to FIG. 1, an antenna module 100 of the embodiment includes a first board 110, a connecting board 120, a second board 130, an antenna radiator 140, and a circuit reference ground 150. The first board 110 at least includes a first end 111. The connecting board 120 has a first connection end 121 and a second connection end 122 opposite to the first connection end 121, and the first connection end 121 is connected to the first end 111 of the first board 110. The second board 130 includes a second end 131 and a bottom end 132 opposite to the second end 131, and the second end 131 is connected to the second connection end 122 of the connecting board 120.

The first board 110 and the second board 130 are made of the same material, but the connecting board 120 is made of a material different from that of the first board 110 and the second board 130. The connecting board 120 is a flexible material. However, in other embodiments of the disclosure, the first board 110 and the second board 130 may be made of different materials, which is not limited in the disclosure.

In the embodiment, for example, the first board 110 and the second board 130 are rigid circuit boards, the connecting board 120 is a flexible circuit board, for example. Moreover, after being connected to one another, for example, the first board 110, the connecting board 120, and the second board 130 are a rigid-flex board, but the disclosure is not limited thereto.

Figure 2:
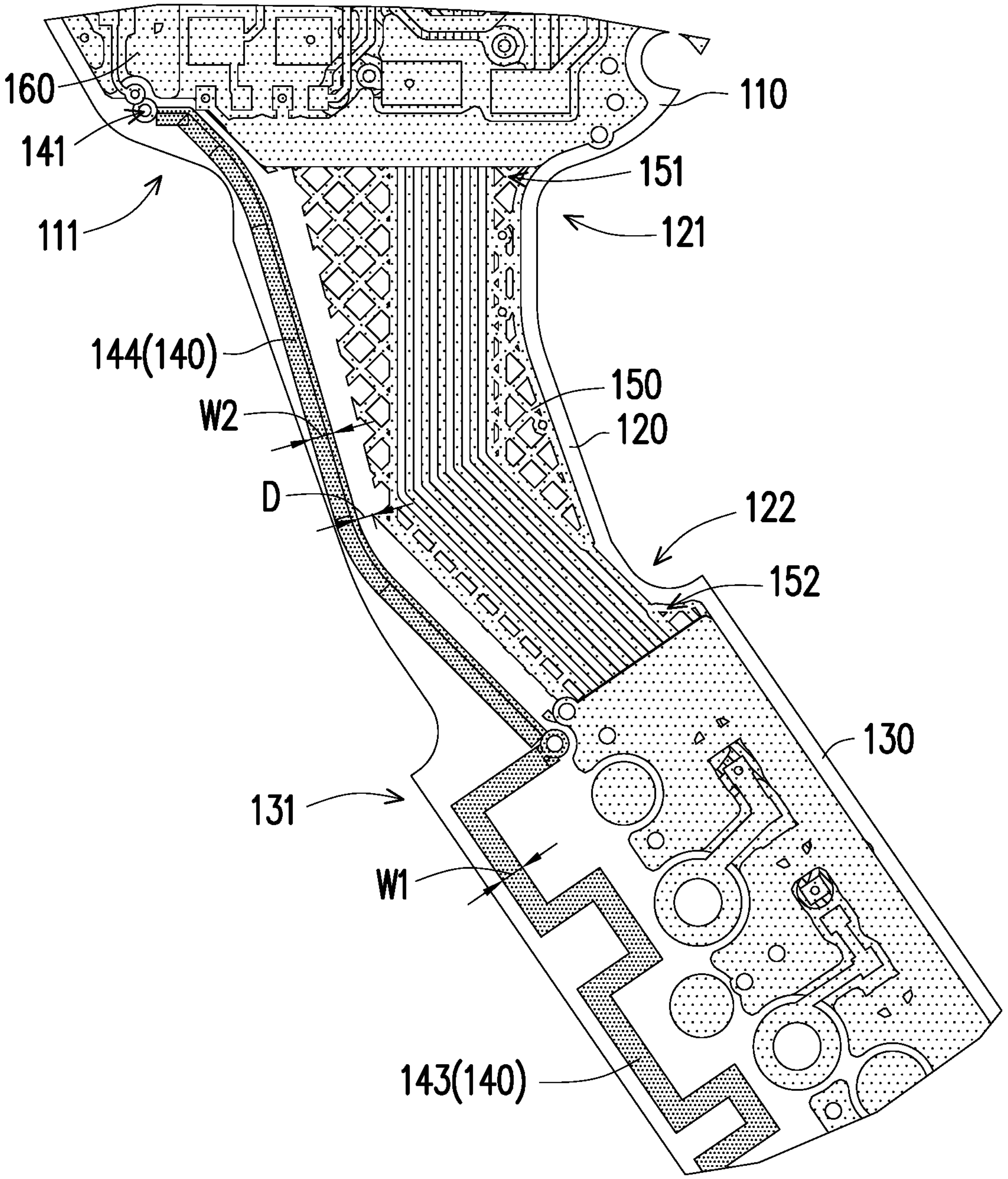
FIG. 2 is an enlarged view of part of the antenna module of FIG. 1.

FIG. 2 is an enlarged view of part of the antenna module of FIG. 1. Referring to FIG. 1 and FIG. 2, in the embodiment, the antenna radiator 140 of the antenna module 100 extends along the extending direction of the connecting board 120 and the second board 130, and defines a first radiation end 141 and a second radiation end 142 (FIG. 1) opposite to the first radiation end 141. The first radiation end 141 is formed on the first connection end 121 of the connecting board 120 and electrically connected to the first board 110, while the second radiation end 142 is formed on the second board 130 and extends to the bottom end 132 of the second board 130, as shown in FIG. 1.

In the embodiment, the antenna radiator 140 includes a first portion 143 and a second portion 144 connected to each other. The first portion 143 is disposed on the second board 130, and the second portion 144 is disposed on the connecting board 120. The first portion 143 has a patterned structure, and the patterned structure is meandering and includes multiple bends as shown in FIG. 1 and FIG. 2. The second portion 144 is curved or straight, as shown in FIG. 1 and FIG. 2. The first radiation end 141 of the antenna radiator 140 is formed on the second portion 144, and the second radiation end 142 is formed on the first portion 143.

In the embodiment, in the antenna radiator 140, the width W1 of the first portion 143 is greater than the width W2 of the second portion 144. Note that the second portion 144 of the antenna radiator 140 can also be adjusted to be a line segment with bends when there is enough overall width of the connecting board 120, which is not limited in the disclosure.

In the embodiment, the respective lengths and widths of the first portion 143 and the second portion 144 of the antenna radiator 140 may affect the impedance value of the entire antenna radiator 140, and the designer can adjust the antenna radiator 140 to an ideal impedance value by changing the respective lengths and widths of the first portion 143 and the second portion 144 to implement the effect of customized design. In the embodiment, the impedance value of the antenna radiator 140 is 50 ohms.

In the embodiment, the circuit reference ground 150 of the antenna module 100 extends along the extending direction of the first board 110, the connecting board 120 and the second board 130. That is, the circuit reference ground 150 of the antenna module 100 extends from the first board 110 to the second board 130, and defines a first reference end 151 and a second reference end 152 opposite to the first reference end 151. The first reference end 151 is formed on the first board 110, and the second reference end 152 is formed on the second board 130. The circuit reference ground 150 and the antenna radiator 140 are spaced apart and formed an interval of a distance D (FIG. 2) between the circuit reference ground 150 and the antenna radiator 140. The distance D (FIG. 2) between the second portion 144 of the antenna radiator 140 and the circuit reference ground 150 is greater than or equal to 0.4 mm, and the coupling effect between the antenna radiator 140 and the circuit reference ground 150 may be reduced, thereby implementing higher gain variation and antenna performance of the antenna module 100.

In the embodiment, the distance D (FIG. 2) between the second portion 144 of the antenna radiator 140 and the circuit reference ground 150 is 0.4 mm, the frequency band coupled out by the antenna radiator 140 ranges from 2.4 GHz to 2.5 GHz, and the gain of the antenna module 100 in this frequency band is 0.3 dB. Note that the distance D between the second portion 144 of the antenna radiator 140 and the circuit reference ground 150 may also affect the impedance value of the entire antenna radiator 140, the designer can adjust the antenna radiator 140 to an ideal impedance value by changing the magnitude of the distance D to implement the effect of customized design.

In the embodiment, the connecting board 120 is bendable due to its flexible feature, and after being bent, the connecting board 120 does not affect the operation of the antenna radiator 140 and the circuit reference ground 150 located thereon, so that the first board 110 and the second board 130 can be not on the same plane and the flexibility in configuring the first board 110 and the second board 130 may be improved. More space on the first board 110 and the second board 130 is freed up since the distribution range of the antenna radiator 140 and the circuit reference ground 150 can cover the connecting board 120 for connecting the first board 110 and the second board 130, so as to effectively improve the space utilization efficiency of the antenna module 100.

In addition, the antenna radiator 140 of the embodiment is directly disposed on the connecting board 120 and the second board 130, so connection errors or energy loss resulting from the antenna radiator 140 being disposed on another circuit board (not shown) and connected to the connecting board 120 and the second board 130 through elements such as connectors (not shown) can be prevented.

Note that the antenna module 100 of the embodiment is applied to the interior of a true wireless earphone. However, in other embodiments of the disclosure, the antenna module 100 may also be applied to the interior of the earphone or other types of electronic devices in a similar stack structure, which is not limited by the disclosure.

In the embodiment, the antenna module 100 further includes an antenna chip assembly 160. The antenna chip assembly 160 is disposed on the first board 110, and the first radiation end 141 of the antenna radiator 140 is electrically connected to the antenna chip assembly 160. In addition, the circuit reference ground 150 and the antenna radiator 140 on the connecting board 120 has a thickness greater than 0.33 oz.

Note that in the embodiment, when the thickness of the circuit reference ground 150 and the antenna radiator 140 on the connecting board 120 is represented by 0.33 oz, it represents the thickness of the circuit reference ground 150 and the antenna radiator 140 with a weight of 0.33 oz after being evenly covered by the raw materials of one square meter of the area. After scaling, the circuit reference ground 150 and the antenna radiator 140 have a thickness of 0.33 oz equivalent to a thickness of 12 μm. With such thickness, the circuit reference ground 150 and the antenna radiator 140 still have good conduction performance.

In summary, in the antenna module of the disclosure, more space on the first board and the second board is freed up since the distribution range of the antenna radiator and the circuit reference ground can cover the connecting board for connecting the first board and the second board, so as to effectively improve the space utilization efficiency of the antenna module. In addition, the distance between the circuit reference ground and the antenna radiator can reduce the coupling effect between the two, thereby implementing higher gain variation and antenna performance of the antenna module. Furthermore, the antenna radiator is directly disposed on the connecting board and the second board, so connection errors or energy loss resulting from the antenna radiator being disposed on another circuit board and connected to the connecting board and the second board through elements such as connectors can be prevented.

What is claimed is:

1. An antenna module, comprising:

a first board, at least comprising a first end;

a connecting board, comprising a first connection end and a second connection end opposite to the first connection end, wherein the first connection end is connected to the first end of the first board;

a second board, comprising a second end and a bottom end opposite to the second end, wherein the second end is connected to the second connection end of the connecting board, and the second board and the connecting board are made of different materials;

an antenna radiator, extending along an extending direction of the connecting board and the second board and defining a first radiation end and a second radiation end opposite to the first radiation end, wherein the first radiation end is formed on the first connection end of the connecting board and electrically connected to the first board, and the second radiation end is formed on the second board; and a circuit reference ground, extending along an extending direction of the first board, the connecting board, and the second board to define a first reference end and a second reference end opposite to the first reference end, wherein the first reference end is formed on the first board, and the second reference end is formed on the second board;

wherein the circuit reference ground and the antenna radiator are spaced apart and form an interval between the circuit reference ground and the antenna radiator.

2. The antenna module according to claim 1, wherein the antenna radiator comprises a first portion and a second portion connected to each other, the first portion is disposed on the second board, the second portion is disposed on the connecting board, the first portion has a patterned structure, the first radiation end is formed on the second portion, and the second radiation end is formed on the first portion and extends to the bottom end of the second board.

3. The antenna module according to claim 2, wherein a distance of the interval between the second portion of the antenna radiator and the circuit reference ground is greater than or equal to 0.4 mm.

4. The antenna module according to claim 2, wherein the patterned structure is meandering and comprises a plurality of bends.

5. The antenna module according to claim 2, wherein the second portion is arc-shaped or straight.

6. The antenna module according to claim 2, wherein the connecting board is made of flexible materials.

7. The antenna module according to claim 2, wherein a width of the first portion is greater than a width of the second portion.

8. The antenna module according to claim 1, further comprising an antenna chip assembly disposed on the first board, wherein the antenna radiator is electrically connected to the antenna chip assembly.

9. The antenna module according to claim 1, wherein on the connecting board, the circuit reference ground and the antenna radiator have a thickness greater than or equal to 12 μm.

10. The antenna module according to claim 1, wherein a frequency band coupled out by the antenna radiator ranges from 2.4 GHz to 2.5 GHz.

* * * * *